Patented Dec. 5, 1933

1,937,689

UNITED STATES PATENT OFFICE 1,937,689

OXIDIZING CATALYST

Joseph C. W. Frazer, Baltimore, Md.

No Drawing. Application July 23, 1929
Serial No. 380,463

7 Claims. (Cl. 23—234)

This invention relates to catalysts, and especially to catalysts capable of causing oxidizing reactions.

It is well known that various single metallic oxides are satisfactory agents for catalytically oxidizing gases and vapors at elevated temperatures. Although some of these oxides, for instance, oxides of cobalt or nickel, may show some catalytic activity at reduced temperatures, their lives have been short, or their continued conversion efficiencies were low, and because as prepared for such use these oxides have been thought to be perfectly pure, their deficiency in catalytic activity at low temperatures has been thought to be inherent.

The object of the invention is to provide a catalyst comprising an oxide of a single metal, which is highly and continuously active for vapor phase oxidation at reduced temperatures, possesses unlimited life when used in dry gas atmosphere, may be easily and economically prepared in a variety of ways, and which may be readily revivified if necessary.

I have found that, contrary to the prevailing beliefs, oxide of nickel, or oxide of cobalt, were inefficient as low temperature catalysts because, despite the careful purification which has previously been practiced, they contained an amount of impurities sufficient to reduce their catalytic power. In other words, I have found that by preparing these materials in a higher state of purity than heretofore, there is produced a catalyst comprising an oxide of a single metal, which is capable of high and long continued catalytic activity at reduced temperatures.

The amount of poisoning impurity retained by the oxides of the prior art is not susceptible of exact quantitative determination by present analytical methods, and the amount necessary to render it inefficient may, and probably does, vary according to the impurity. Consequently it is not possible to state precise limits below which the impurity must be removed to produce the catalysts according to the invention, and in the absence of exact knowledge, this characteristic of the catalysts is defined to be their containing "less than the tolerable limit of poisoning impurities", it being evident from what has been said of my invention, that if the "tolerable" limit is surpassed, the inefficient catalysts of the prior art are produced.

The proper state of purity, as embraced in the foregoing definition, however, can readily be determined experimentally in a simple manner by means known to workers in the art; when the criterion of purity is attained, coupled with proper physical state, as will be understood, the materials are highly active oxidizing catalysts in dry gas atmospheres, and their life is apparently unlimited. The proper degree of purity may also be shown as follows. In prior work along these lines, the materials were washed until the wash water gave no test for impurity, it being considered that the oxide was then absolutely pure. However, I find that the oxides thus prepared will give a positive test for impurity when dissolved in acid. On the other hand, catalysts provided by the invention give no test for impurity when dissolved in acid, thus showing adequate purity for the purposes of the invention.

The invention contemplates as its preferred embodiment oxide of cobalt, but it is likewise applicable to oxide of nickel. The most recent determinations show each of these metals to have an atomic weight between 58 and 59, and this characteristic will be used to refer concisely to the catalysts comprised by the invention. The catalysts may be prepared in a variety of ways, which together with the characteristics of the catalysts, may best be described in the following specific examples of its preferred embodiment.

*Example 1.*—A solution of 211 grams of cobaltous nitrate [$Co(NO_3)_2.6H_2O$] in 200 cc. of cold water is added slowly to 100 grams of sodium hydroxide (NaOH) made up to a 1.3 Sp. g. solution. The reacting mixture is stirred vigorously and its temperature is preferably maintained below 10° C. There is now added 34.5 grams of sodium hypochlorite (NaOCl) in 10 per cent solution, and the mixture is stirred for ten minutes, after which it is diluted and the precipitate washed several times by decantation with distilled water, to remove the mechanically-bound impurities as far as possible, and the oxide is then treated to reduce the adsorbed poisoning impurities, chlorides in this case, below the tolerable limit. I have found that a very satisfactory manner of doing this is to wash the oxide with a solution containing a substance which will displace the adsorbed poisoning impurities and which will itself be harmless. In most cases this is best accomplished by using the nitrate of the metal whose oxide is being purified, the nitrate radical causing desorption of the adsorbed chloride ion and itself being adsorbed and, upon hearing, forming oxide, thus giving no undesirable impurity in the final product. In this case the oxide is washed with a solution of cobalt nitrate in distilled water until the wash solution after several days contact with the oxide shows no trace of chlorides. It is then filtered and sucked dry, preferably on a fritted glass filter, transfered to a flask containing concentrated nitric acid solution saturated with cobalt nitrate, and allowed to stand for two days, when it is filtered and washed with a fresh portion of the nitric acid solution. Cobalt oxide is appreciably soluble in nitric acid, and one function of saturating the acid with cobalt nitrate is to reduce dissolution of the oxide by the acid, and hence to cut down washing losses.

The oxide of cobalt thus prepared gives no test for chlorides when dissolved in nitric acid; when air dried at 100° C. it is brown in color; and on microscopic examination with a dark stage it seems to be horny and gel-like in structure, indicating a highly porous physical state which is desirable in oxide catalysts. The material, either as washed or subsequently dried at 100° C. is placed in a glass tube and heated to about 200° C., while air or oxygen dried with phosphorous pentoxide is passed through it. When water ceases to appear in the effluent gas the oxide is ready for use. During the heating any cobalt nitrate retained by the oxide is decomposed to oxide, so that the oxide is wholly pure.

*Example 2.*—The oxide of cobalt precipitated in the foregoing manner is washed repeatedly by decantation with distilled water until an acid solution of a sample of the oxide gives no test for chlorides, when it is dried at 200° in the manner described above. Although the product is as satisfactory as in the preceding example, the tendency to peptize upon continued washing may cause a loss of some of the material.

*Example 3.*—A particularly desirable means of preparing the precipitated oxide in the required state of purity is by electrolytic purification. An especially suitable procedure is to wash out the major portion of the mechanically held impurities and then suspend the oxide in distilled water in a suitable container in which there are placed two porous cells each containing water and a suitable electrode, platinum for example. Upon passing a current between the electrodes, the impurities pass from the oxide into the appropriate cups. It is usually desirable to preliminarily clean the porous cells by boiling in nitric acid and then washing free from acid.

Oxides free from poisoning impurities may be readily prepared in this manner, and when purified are prepared for use by drying and heating in the manner described in Example 1. This procedure has been found to be very desirable for the preparation of oxides generally in a state of very high purity. It is simple, the electrolysis may be permitted to run for long periods with very little attention, there is no loss of material, and it does not require the solutions used for washing described in Example 1, and it effectively removes adsorbed impurities.

*Example 4.*—It has previously been proposed to prepare pure oxide catalysts by heating of thermally unstable salts, the nitrate for instance. Cobaltic oxide, however, when prepared by the known and practiced ignition methods, does not possess satisfactory catalytic activity, especially at reduced temperatures, and this is apparently due to a sintering action which results at the temperatures used in previous processes for decomposition of the nitrate. I have found that oxide of cobalt in the active form characteristic of the invention may be produced also by careful heating of the nitrate in an atmosphere containing oxygen and water vapor. This is preferably accomplished by passing a stream of air and water vapor over cobaltous nitrate heated to about 200° C. in a tube or other suitable container, the water vapor in the air preferably corresponding to saturation at about 30° C. If desired, the catalyst may be prepared in supported form by saturating acid washed asbestos, or other suitable carrier, with the nitrate, drying at about 100° C., and igniting as above. The function of the water vapor is apparently to bring about by hydrolysis the decomposition of the nitrate at a lower temperature than is possible in ignition in the absence of water vapor, and this lowering of the temperature is sufficient to prevent the deleterious action of heat which has previously accompanied the preparation of oxides by ignition methods. This procedure is also applicable to the preparation of other oxides catalytically active at low temperature. It possesses the advantage, that beginning with a pure material there is no contamination by other materials, the oxide is produced in the desired finely divided state, and the procedure is simple and inexpensive and results in a catalyst having the very desirable characteristics described.

It will be observed that a common feature of the methods given is that the oxide is prepared in a highly porous state from a cobalt compound, with less than the tolerable limit of poisoning impurities, and that it is dried in a current of oxygen-containing gas at about 200° C. Dried at lower temperatures, 100° C. for example, the oxide does not appear to possess its full activity, and when dried at such low temperatures it appears to be especially susceptible to the harmful action of water vapor. For these low temperature uses the oxide should not be heated beyond about 250° C. In the preparation of the oxide by wet methods, it is dried in the absence of water vapor, while in the thermal decomposition method of Example 4, water vapor is used. In the latter case, the oxide may be dried in moisture-free air, if desired or necessary, after being produced.

In actual use it has been found that the catalyst produced by any of the foregoing materials is perfectly catalytic for the oxidation of carbon monoxide at reduced temperatures, and it is capable of continuous action so long as the reactant gases are kept free of moisture. For example a 1 per cent mixture of carbon monoxide in air was dried by phosphorous pentoxide and passed at a rate of 100 cc. per minute through about a 10 cm. length of the catalyst in a tube having a cross sectional area of about 1 sq. cm. Tested in this manner, over a range of temperature from —20° C. to 100° C., the oxide of cobalt catalyst converted the carbon monoxide to carbon dioxide at 100 per cent efficiency. Intermittently tested over periods up to four weeks, the catalyst gave no indication of diminished activity in the range of temperature referred to, and so far as can be observed it will act continuously for an unlimited period when protected from moisture.

Tests have demonstrated that the efficiency and life of the catalyst are dependent to some extent upon the use of dry gases. Thus, if the catalyst prepared by the method of Example 1 is dried at 110° C. under a pressure of 1 mm. of mercury and the reactant gases are dried by soda lime only, the catalyzing efficiency is only 75 per cent after one hour, and drops off rapidly thereafter. Also, when the completely active material described above is used with gases containing water vapor in concentration sufficient to exert a vapor pressure of 0.4 mm. mercury, the efficiency falls off to about 47 per cent. It is also characteristic of the catalyst that no induction period is required, even at low temperatures.

When the catalyst has been used under conditions to render it inactive from the presence of moisture, or has absorbed water vapor from the atmosphere, it may be readily revived by heating in a stream of dry air or oxygen, preferably at about 200° C.

Catalysts in accordance with the invention may be used to accomplish the oxidation of most of the readily oxidizable gases and vapors, for example carbon monoxide, ammonia, sulfur dioxide, aldehydes, toluene, etc., by passing them mixed with oxygen or air through the catalyst at or above about 0° C.

Although the invention has been described with reference to oxide of cobalt as the preferred embodiment, it may be also applied to oxide of nickel. Thus, nickelic oxide prepared from the nitrate in accordance with Example 1, and purified electrically in the manner described in Example 3, is 100 per cent efficient in oxidizing carbon monoxide at temperatures down to $-20°$ C. although this oxide appears to adsorb some of the carbon dioxide formed, which may reduce its activity somewhat. Catalytic oxide of nickle according to the invention may be prepared also by ignition of the nitrate in the manner described for oxide of cobalt.

According to the provisions of the patent statutes, I have explained the principle and mode of operation of my invention and have described what I now consider to represent its best embodiment. However, I desire to have it understood that, within the scope of the appended claims the invention may be practiced otherwise than as specifically described.

I claim:

1. As a new article of manufacture, a low temperature oxidation catalyst consisting of oxide of a metal of the group consisting of cobalt and nickel and capable of oxidizing carbon monoxide completely and for an unlimited time at temperatures as low as minus 20° C. in dry gas atmospheres containing carbon monoxide and oxygen, and prepared by converting a compound of said metal to oxide containing less than the limit of poisoning impurities tolerable with production of said activity at low temperatures, and heating said oxide in an oxidizing atmosphere at an elevated temperature not exceeding about 250° C.

2. As a new article of manufacture, a low temperature oxidation catalyst consisting of oxide of a metal of the group consisting of cobalt and nickel prepared by decomposition of a thermally decomposable compound of said metal at an elevated temperature in an atmosphere of air and water vapor in an amount greater than that normally present in the compound, and the catalyst oxidizing carbon monoxide completely and for an unlimited time at temperatures as low as minus 20° C. in dry gas atmospheres containing carbon monoxide and oxygen.

3. As a new article of manufacture, a low temperature oxidation catalyst consisting of oxide of a metal of the group consisting of cobalt and nickel prepared by decomposition of a thermal decomposable compound of said metal at an elevated temperature below about 250° C. in an atmosphere of air saturated with water vapor to cause hydrolysis of the compound, and the catalyst oxidizing carbon monoxide completely and for an unlimited time at temperatures as low as minus 20° C. in dry gas atmospheres containing carbon monoxide and oxygen.

4. As a new article of manufacture, a low temperature oxidizing catalyst consisting of oxide of cobalt prepared by decomposition of cobalt nitrate at an elevated temperature below about 250° C. in an atmosphere of air containing water vapor equivalent to saturation at 30° C., said oxide catalytically oxidizing carbon monoxide completely and for an unlimited time at temperatures as low as minus 20° C. in dry gas atmospheres containing carbon monoxide and oxygen.

5. A process of preparing an oxidation catalyst for use at low temperatures, comprising heating a thermally decomposable compound of a metal of the group consisting of cobalt and nickel at an elevated temperature below that at which the compound normally decomposes in ordinary dry air, and during said heating contacting the heated compound with an atmosphere of air and water vapor in an amount greater than that normally present in air and sufficient to cause hydrolysis of the compound, to thereby decompose the compound below said normal decomposition temperature, and maintaining said atmosphere until decomposition to oxide is complete, to thereby produce oxide of said metal capable of oxidizing carbon monoxide completely and for an unlimited time at temperatures as low as minus 20° C. in dry gas atmospheres containing carbon monoxide and oxygen.

6. A process of preparing an oxidation catalyst for use at low temperatures, comprising heating a thermally decomposable compound of a metal of the group consisting of cobalt and nickel at an elevated temperature below about 250° C., and during said heating contacting the heated compound with an atmosphere of air and water vapor in an amount greater than normally present in air and substantially equivalent to saturation at 30° C. to decompose the compound to oxide at a temperature below that at which the compound decomposes in ordinary dry air, and maintaining said atmosphere until decomposition to oxide is complete, to thereby produce oxide of said metal capable of oxidizing carbon monoxide completely and for an unlimited time at temperatures as low as minus 20° C. in dry gas atmospheres containing carbon monoxide and oxygen.

7. A process of preparing an oxidation catalyst for use at low temperatures, comprising heating cobalt nitrate at an elevated temperature below about 250° C. and during the heating contacting it with an atmosphere of air and water vapor in an amount greater than that normally present in air and sufficient to cause hydrolysis of the nitrate, to thereby decompose the nitrate at a temperature below that at which it normally decomposes in ordinary dry air, and maintaining said atmosphere until decomposition to oxide is complete, to thereby produce cobalt oxide capable of oxidizing carbon monoxide completely and for an unlimited time at temperatures as low as minus 20° C. in dry gas atmospheres containing carbon monoxide and oxygen.

JOSEPH C. W. FRAZER.